J. D. REIFSNYDER.
MACHINE FOR SEALED WRAPPED PACKAGES.
APPLICATION FILED SEPT. 6, 1916.
1,352,221.
Patented Sept. 7, 1920.
8 SHEETS—SHEET 1.
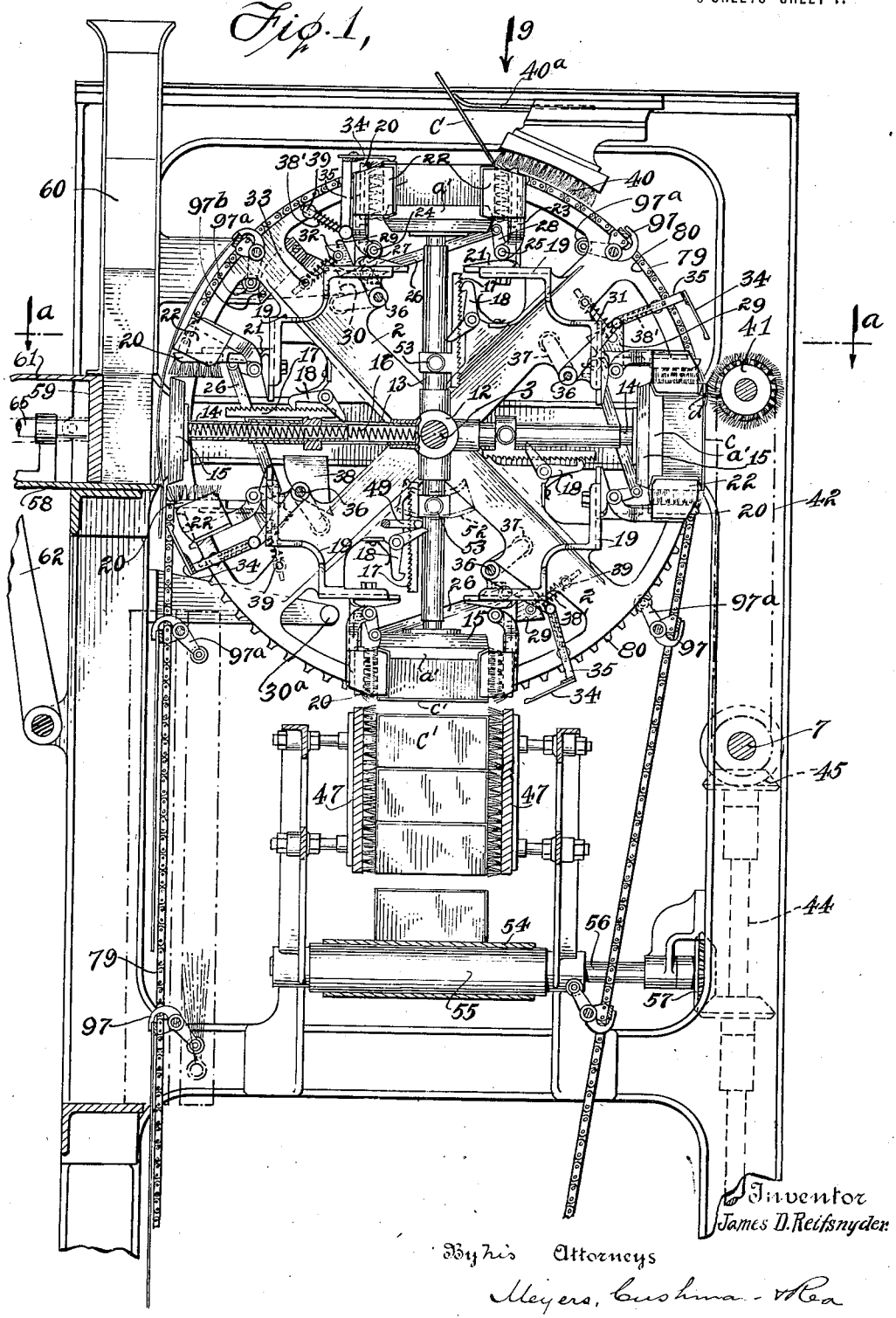
Inventor
James D. Reifsnyder.
By his Attorneys
Meyers, Cushman & Rea

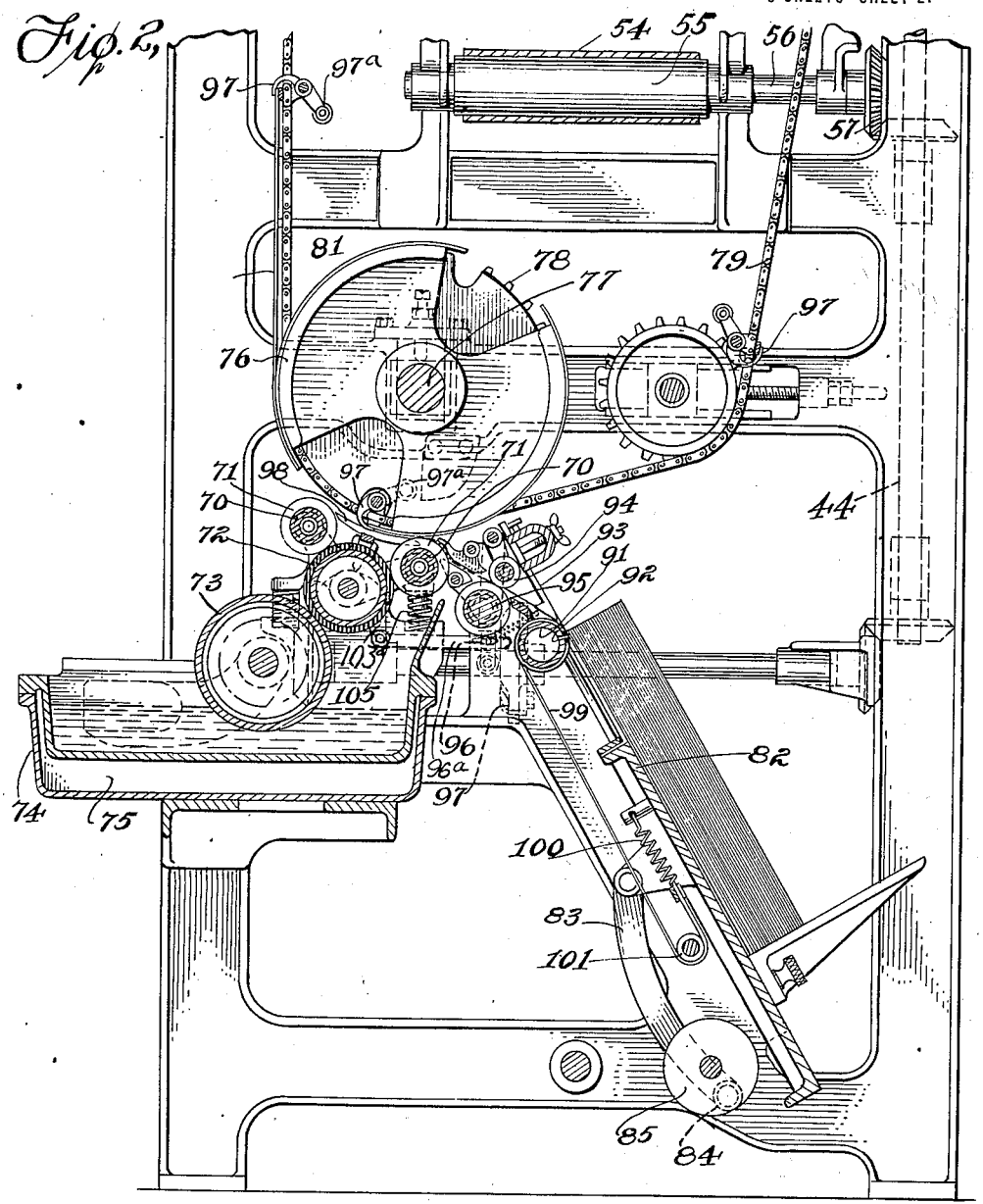

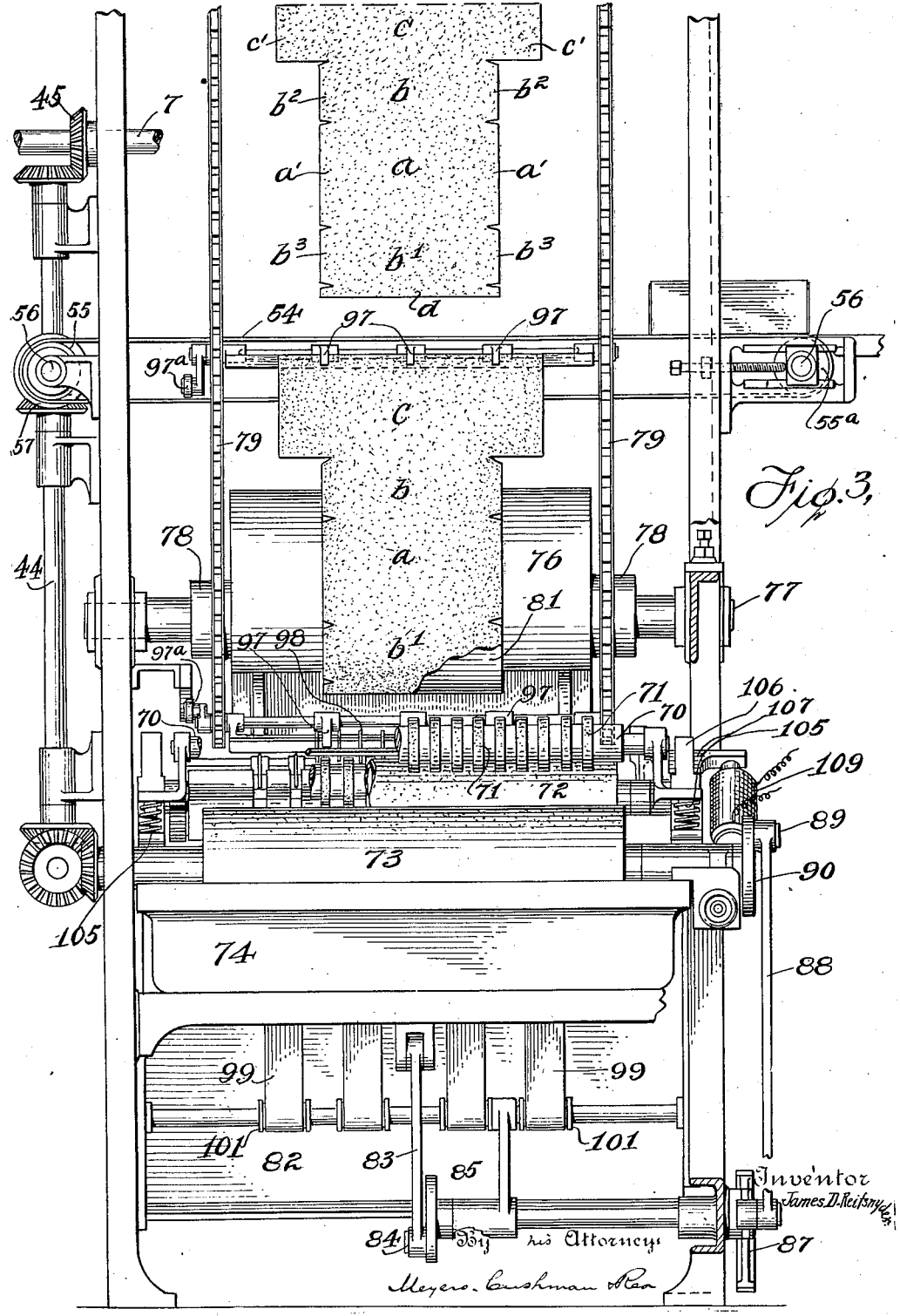

J. D. REIFSNYDER.
MACHINE FOR SEALED WRAPPED PACKAGES.
APPLICATION FILED SEPT. 6, 1916.
1,352,221.
Patented Sept. 7, 1920.
8 SHEETS—SHEET 4.
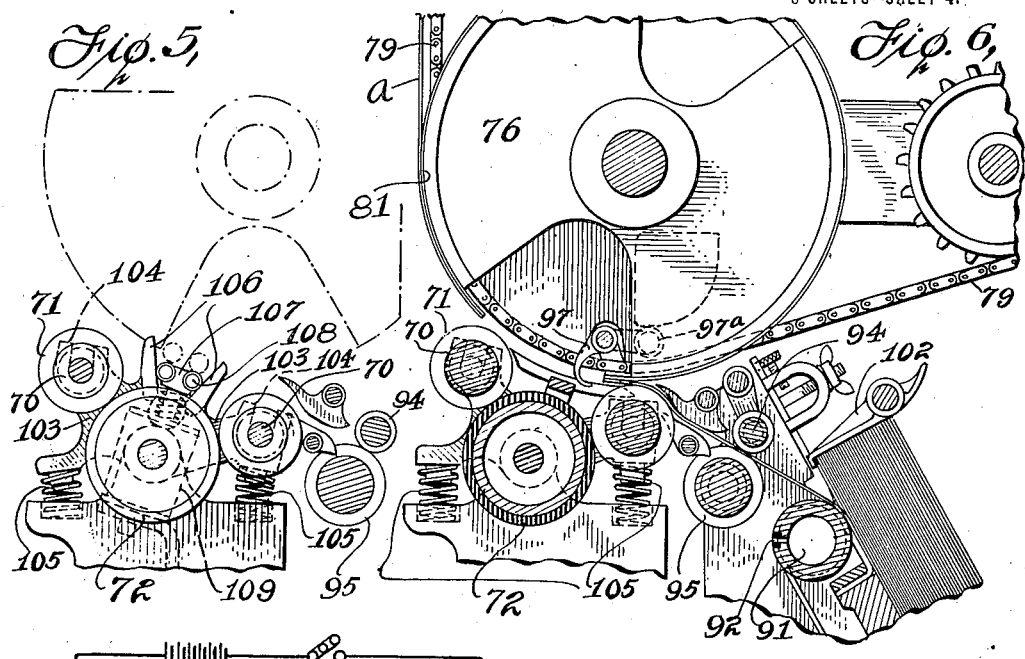
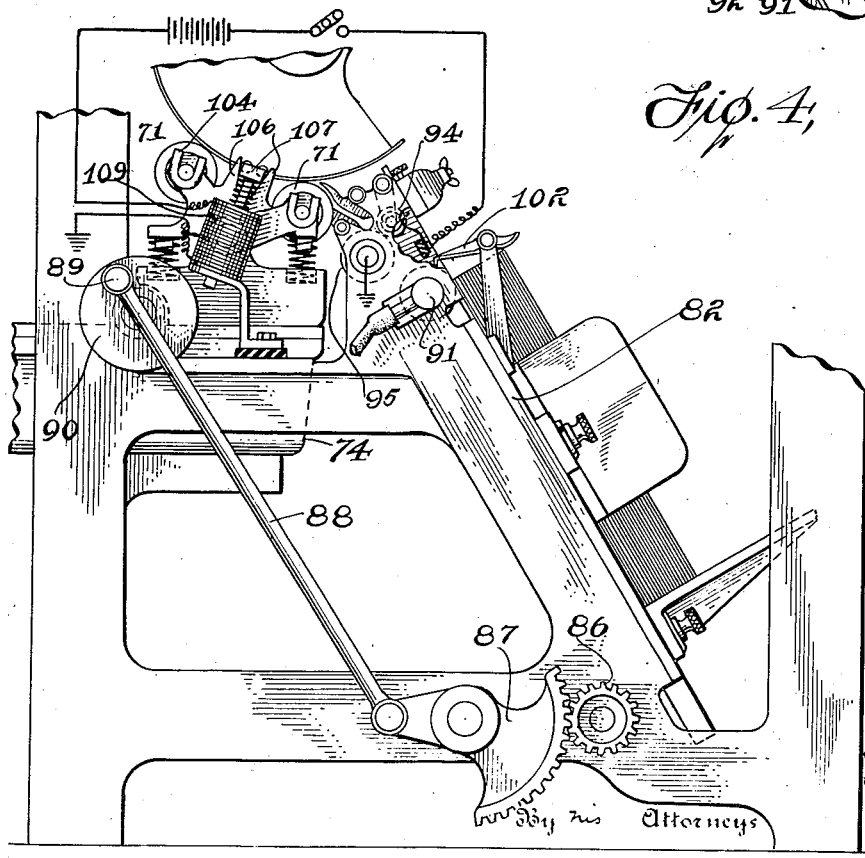
Inventor
James D Reifsnyder,
By his Attorneys
Meyers, Cushman & Rea

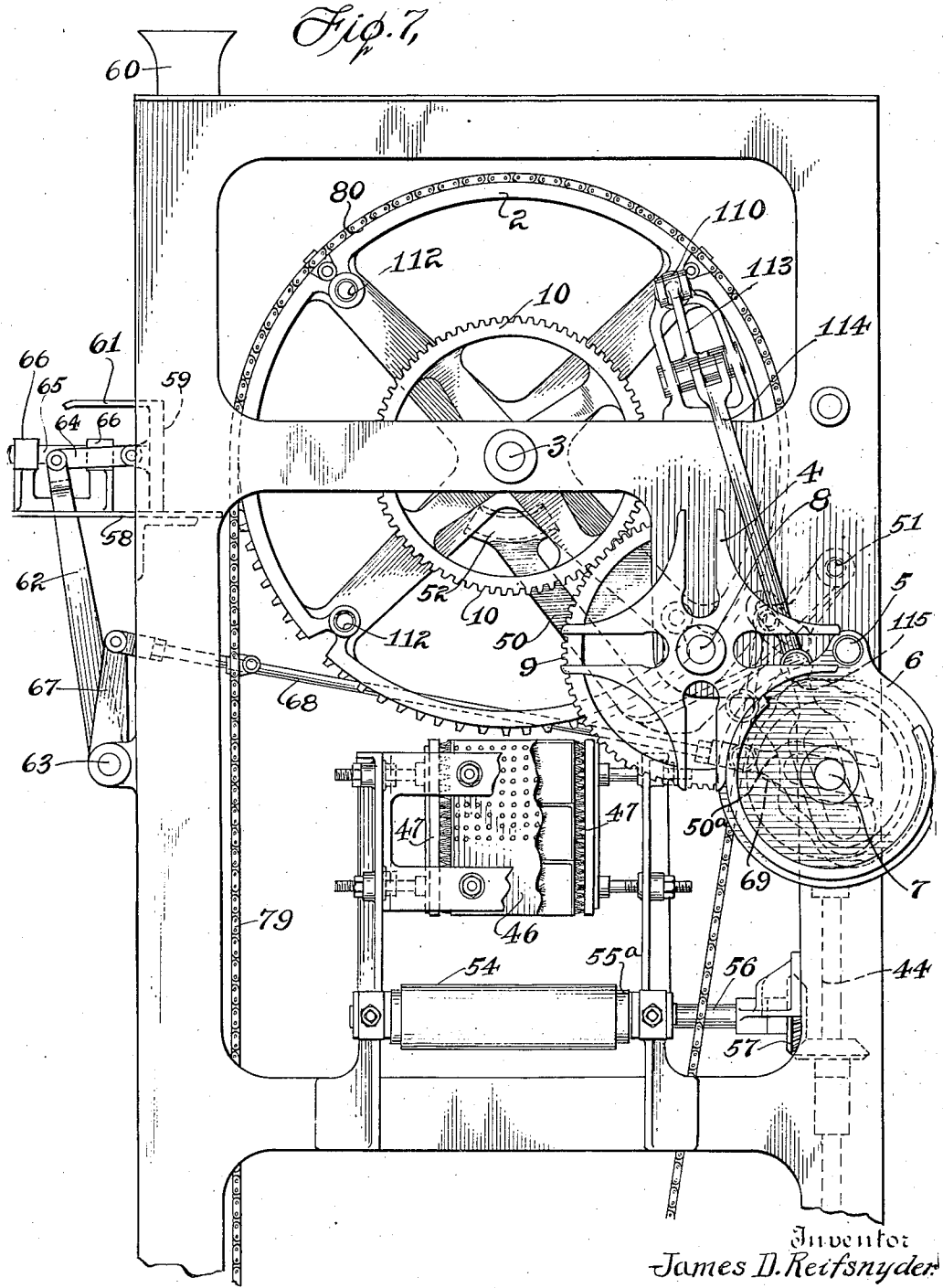

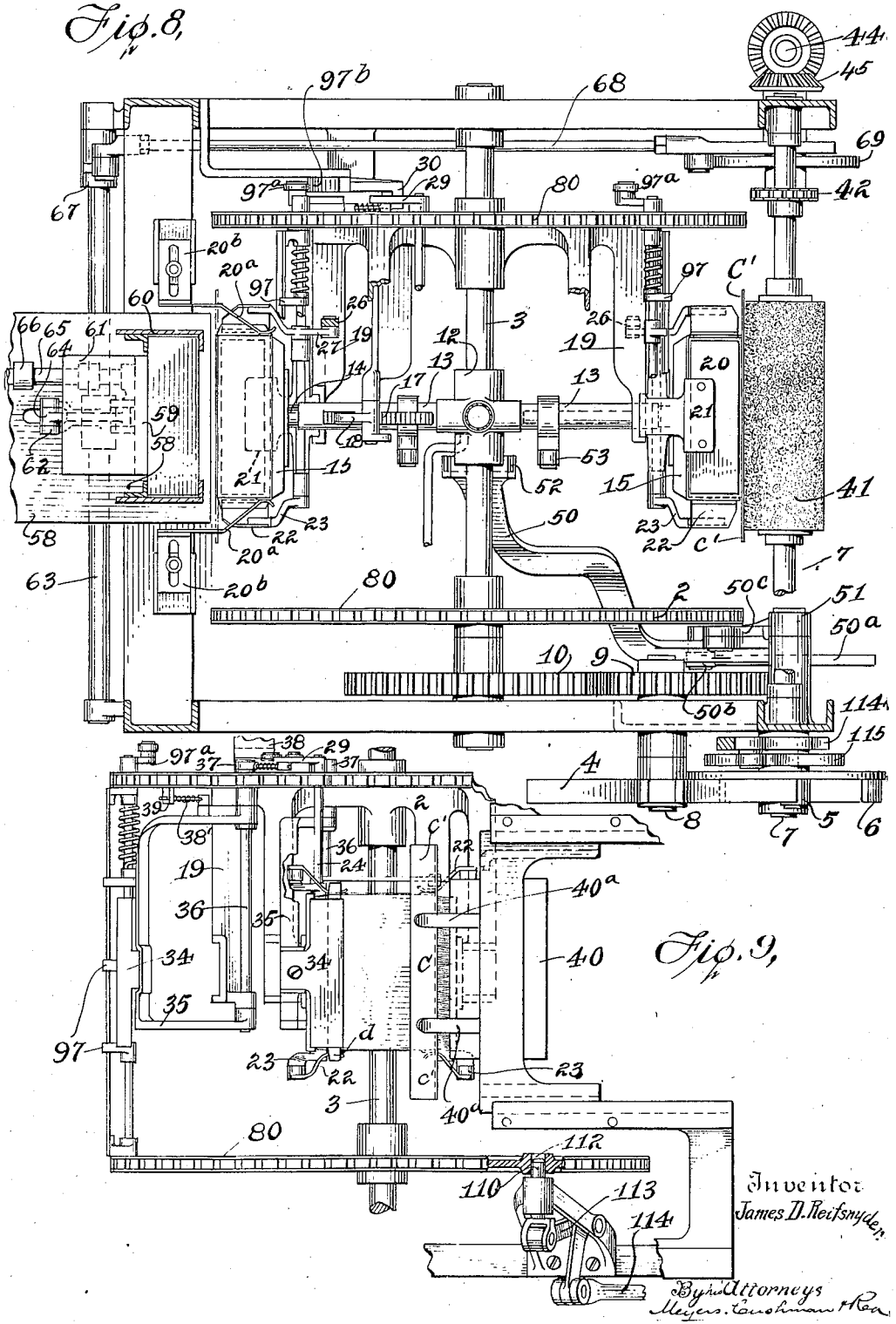

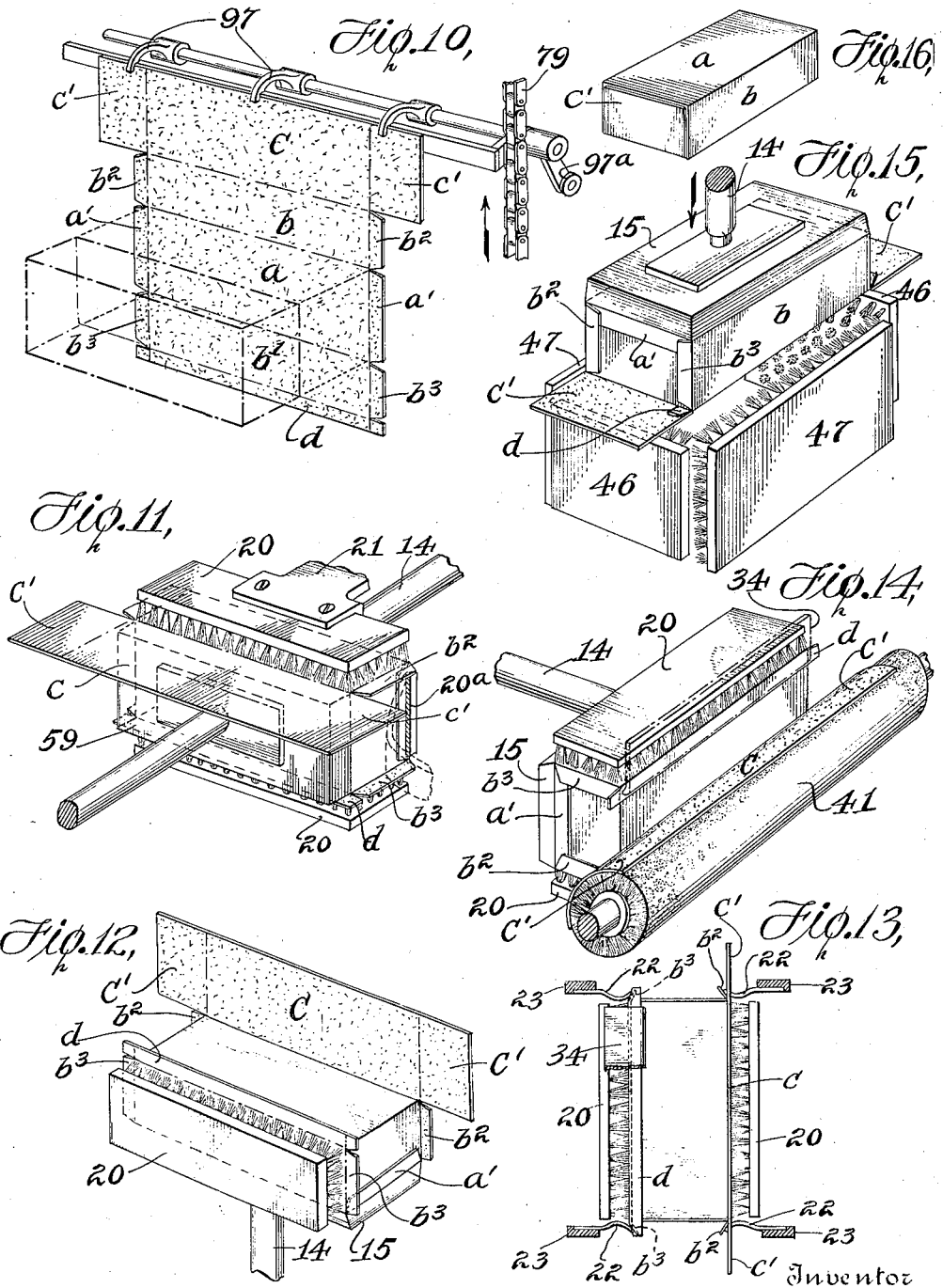

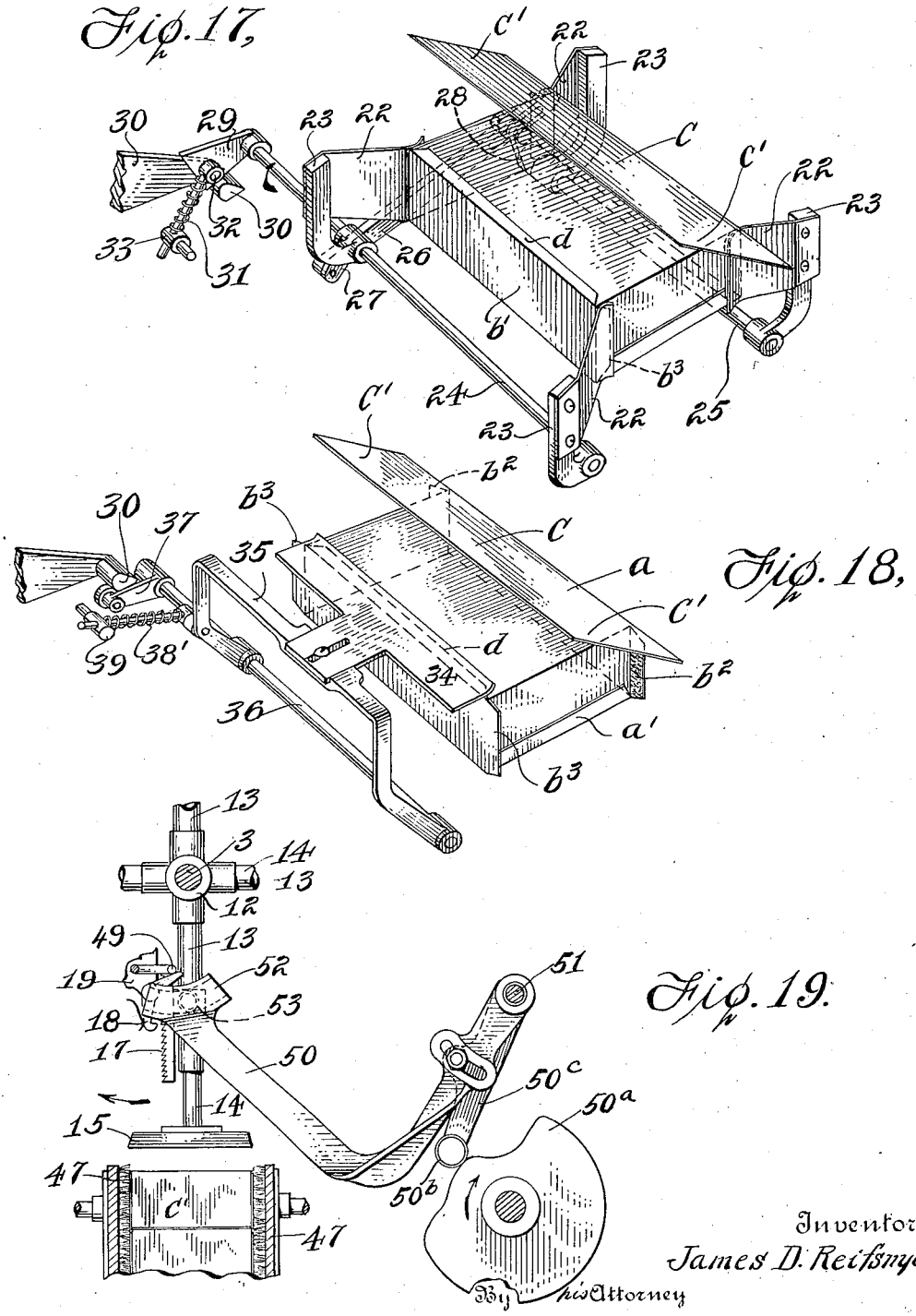

UNITED STATES PATENT OFFICE.

JAMES D. REIFSNYDER, OF PHILADELPHIA, PENNSYLVANIA, ASSIGNOR TO STOKES & SMITH COMPANY, OF SUMMERDALE, PHILADELPHIA, PENNSYLVANIA, A CORPORATION OF PENNSYLVANIA.

MACHINE FOR SEALED WRAPPED PACKAGES.

1,352,221.   Specification of Letters Patent.   Patented Sept. 7, 1920.

Application filed September 6, 1916. Serial No. 118,668.

*To all whom it may concern:*

Be it known that I, JAMES D. REIFSNYDER, a citizen of the United States, residing at 5502 Mascher street, Olney, Philadelphia, in the county of Philadelphia and State of Pennsylvania, have invented certain new and useful Improvements in Machines for Sealed Wrapped Packages, of which the following is a specification.

My present invention relates generally to box or package wrapping machines, and more particularly to a machine of that type wherein an adhesively coated wrapper blank has portions that are folded about and adherently attached to all the exterior walls of a box or package to provide what is known in the art as "sealed wrapped packages."

Boxes or packages wrapped and sealed in the manner described and as herein illustrated, are especially adapted for use in the packing of various classes of merchandise and particularly food products which are more or less affected by atmospheric changes and conditions, or such as are subject to attack by a certain species of vermin, and boxes or packages covered or wrapped by machines such as the machine of the present invention are particularly adapted for use in connection with the manufacture and sale of various kinds of breakfast foods and baked products, such as crackers, cakes, biscuits and the like, as well as various other classes of merchandise such as dried or evaporated fruits that are subject to deterioration from changes in the atmosphere or from attack by vermin.

One object of the present invention is to provide a machine of the type referred to wherein a plurality of boxes or packages are passing through the various cover affixing stages simultaneously, whereby the machine is capable of a large daily output.

Another object of the invention is to provide a machine that is automatic in its various departments, and wherein the wrapper or covering blanks are automatically selected singly from a stack or pile of such blanks, coated upon one face with an adhesive and then fed in proper registered position with relation to the box or package to be wrapped, and with the folding and affixing devices.

Another object of the invention is to provide a machine of the type referred to wherein the organization and arrangement of the various mechanisms is such that the machine requires a comparatively small amount of floor space, and wherein the wrapper or covering blanks are delivered in such manner that curling thereof, due to the moist adhesive coating thereon, is materially reduced, thus obviating a serious difficulty found to exist in automatic wrapping machinery wherein attempts have been made to transport adhesively coated blanks or sheets.

A further object of the invention is to provide a machine for adherently affixing a wrapper-blank to the outer walls of a box or package and wherein the wrapper affixing devices are caused to remain in contact with and hold the affixed portions of the wrapper against the walls of the package for a considerable period of time in order to insure secure union of the wrapper with the walls of the box or package.

The invention has in view other more or less important objects, all of which are made apparent in the detailed description which follows.

I have illustrated in the accompanying drawings one type of machine for carrying out the various objects of the invention, but I do not wish to be understood as limiting myself to the various details shown and described, as the mechanisms shown are merely illustrative and not to be considered as restrictive, for I am well aware that changes in the construction, arrangement and operation of the various parts may be made without departing from the spirit of the invention.

In the said drawings:

Figure 1 is a side elevation partly in section of the wrapper folding and affixing mechanism of a machine constructed in accordance with the present invention.

Fig. 2 is a similar view partly in section of the wrapper-blank feeding, gumming and blank transporting mechanism of the machine.

Fig. 3 is a front elevation of that portion of the machine illustrated in Fig. 2.

Fig. 4 is a side elevation of the wrapper-blank selecting and feeding means.

Fig. 5 is a detail view of a portion of the gumming means.

Fig. 6 is a vertical sectional view of portions of the wrapper-blank feeding means and gumming means.

Fig. 7 is a side elevation of a portion of the machine illustrating the actuating means for the traveling carrier and the automatic package feeding means, certain elements of the machine being omitted from the drawing for the sake of clearness.

Fig. 8 is a transverse section on the line $a$—$a$ Fig. 1.

Fig. 9 is a top plan view looking in the direction of the arrow Fig. 1.

Figs. 10, 11, 12, 13, 14 and 15 are views illustrating the successive stages through which the package and its wrapper go during the operation of the machine.

Fig. 16 is a perspective view of a package completely wrapped by the machine.

Fig. 17 is a detail perspective view of the end-lap-wiping or affixing devices and their operating mechanism.

Fig. 18 is a similar view of the marginal lap-wiping device and its operating mechanism.

Fig. 19 is an elevation of one construction of means for positively actuating the platens as they successively appear at the package ejecting position.

As the machine is constructed to cause all portions of the wrapper-blank to be adherently affixed to all the exterior walls of the box or package so as to completely cover and seal the same, and at the same time present a smooth and neat exterior, a blank of special form is required. While this special form of blank may vary somewhat in its general outline and may vary in size and dimensions according to variations in the size and dimensions of the box or package to be wrapped, the blanks in all cases will nevertheless be "notched" or "cornered", and will be provided with marginal lap portions as distinguished from unnotched or rectangular blanks or sheets, such as are usually employed in wrapping machines of ordinary construction, and wherein the sheets or blanks are loosely folded about the article being wrapped and not adherently affixed to the walls thereof, and from which known machines and methods, the machine of the present invention is clearly distinguished, in that not only the plan of operation, but the finished product of the machine, is radically different from the ordinary wrapping machine and its product.

The present form of blank I have elected to show in conjunction with the present machine is more clearly illustrated in Fig. 10 of the accompanying drawing, and in which the blank is shown as consisting of a plurality of integrally united sections, and in which the letter $a$, designates the bottom covering section; $b$ and $b^1$ side covering sections, and $c$ the top covering section. The bottom covering section $a$, is provided at its opposite ends with marginal laps $a'$; the side covering sections $b$, $b^1$ are each respectively provided at its opposite ends with marginal laps $b^2$, $b^3$, and the said side covering section $b^1$ is further provided with a longitudinally extending marginal lap $d$, while the top covering section $c$ is provided at its opposite ends with end covering laps $c'$, the latter being preferably of the same dimensions as the ends of the box or package to which they are affixed.

It is to be understood that the wrapper-blanks are first coated on one face with a suitable adhesive material, and the blanks are then folded about and adherently affixed to the exterior walls of the box or package, completely covering the same.

According to the plan of operation of the machine as herein illustrated, the adhesively coated wrapper-blanks are brought successively to an accurately registered position with relation to certain parts of the machine, and the box or package to be wrapped is then moved into contact with an appropriate section of the blank, as for instance the bottom covering section, so that the contacting portion of the blank will be adherently affixed to the presented wall of the package, this step in the operation being more clearly illustrated in Fig. 10 of the accompanying drawings. The package with its partially attached wrapper-blank is then forced into or between certain of the wrapper-folding and affixing devices of the machine which operate to adherently affix the two opposite side covering portions, $b$, $b'$ of the wrapper-blank to two opposite sides of the box or package, and to also affix the marginal portions $a'$ at the opposite ends of the bottom covering section $a$ of the blank to opposite ends of the box or package as more clearly illustrated in Figs. 11 and 12. The thus partially covered package is then advanced to another point in the machine and during this movement other marginal portions $b^2$, $b^3$ and $d$ of the wrapper-blank are adherently affixed to the opposite ends of the box or package and also to the top wall of the package as illustrated in Fig. 13, after which the box or package is then advanced to a still farther position where the top covering section $c$ of the wrapper-blank is adherently affixed to the top wall of the box or package, as illustrated in Fig. 14, leaving only the end covering laps $c'$ of the blank to be affixed to the ends of the box or package, and these end-laps are properly affixed as the package is ejected from the machine, as illustrated in Fig. 15.

In the illustrated embodiment of the invention the various wrapper-blank folding and affixing devices are mounted upon and move with a traveling carrier, to which a step-by-step advancing movement is imparted, there being a plurality of sets of such devices, and according to the plan of operation of the machine, the boxes or packages to be covered are successively delivered to one set of the folding and affixing devices when the carrier is in a certain definite position, and after passing through the various stages of operation they are successively ejected from the machine, the object being to have a plurality of packages undergoing treatment at the same time, and the folding and affixing devices remaining in contact with and holding the various affixed portions of the wrapper-blank during the entire cycle of operations of the machine, so as to insure secure application of all portions of the wrapper-blank to the walls of the package, to the end that the complete package will be neatly and smoothly wrapped and securely sealed.

In the accompanying drawings Figs. 1 and 2 when taken together illustrate a complete machine in side elevation.

In said figures and in the other figures of the drawings where like parts are illustrated, the reference numeral 1 designates the machine frame which may be of any approved design. In the design illustrated the wrapper-blank folding and affixing mechanism is shown as being arranged above the wrapper-blank selecting, gumming and transporting mechanisms. This arrangement of the several mechanisms is preferred in some instances because this special design of machine requires very little floor space, and inasmuch as the adhesively coated wrapper-blanks are carried in suspended position upwardly from the gumming means to the folding and affixing means, there is less danger of the coated blanks becoming unduly curled by reason of the fact that they have a moist adhesive coating on one face.

As before stated, there are a plurality of sets of wrapper-folding and affixing devices in the machine, and these are mounted upon a traveling carrier, which in the present instance is shown as consisting of a wheel-like frame 2 mounted upon a rotating shaft 3, the carrier being given a step-by-step advancing movement by means of a Geneva wheel 4, Fig. 7, which is actuated by a stud 5 carried by a disk 6 the latter being mounted upon and driven from the main power shaft 7. The Geneva wheel 4 is mounted upon a stub shaft 8, and on this shaft there is also mounted a gear-wheel 9 which meshes with a gear-wheel 10 fixed to the shaft 3 on which the traveling carrier 2 is mounted.

The shaft 3 also carries a hub 12 having a plurality of radially extending hollow arms 13, there being four such arms in the present instance arranged at right angles to each other, and on each arm there is a telescoping stem 14, carrying a platen 15 at its outer end. The platens are made yieldably depressible by reason of a coiled spring 16 inclosed within the telescoping sections as more clearly shown in Fig. 1. Each stem 14 carries a toothed bar 17 with which a spring actuated latch 18 engages, the latch operating to lock and hold its platen in proper depressed position under the pressure of a package against the outer face of the platen, as will presently appear.

The wheel-like frame 2 of the traveling carrier is provided with four pairs of supporting plates or brackets 19 upon which the several sets of wrapper-blank folding and affixing devices are mounted, one pair of said plates being provided for each set of said devices. As the several sets of these devices are duplicates of one another, a description of one set will suffice for all, the several sets being shown in assembled relation in Figs. 1 and 8, while portions of an individual set are more clearly illustrated in Figs. 17 and 18.

Each set of wrapper-blank folding and affixing devices consists of a pair of oppositely disposed wipers shown in the present instance as consisting of brushes 20, said brushes being carried by brackets 21 that are adjustably mounted in ways formed in the outer face of the plates 19, the said brushes being disposed at opposite sides of the path of movement of the platen 15 when it is depressed, so that if a wrapper-blank is positioned across the outer face of the platen and a wall of the package to be wrapped is moved into contact with a section thereof, as the section $a$, and then forced inward so as to depress the platen, said blank section, as well as other portions of the wrapper-blank, as for instance the side covering sections $b$, $b'$, will be folded up against and affixed to the opposite side walls of the package by means of the brushes 20. At the same time the marginal laps $a'$, will be affixed to the opposite ends of the package by means of two yielding wiping blades $20^a$ carried by adjustable brackets $20^b$ mounted on the machine frame, as more clearly shown in Figs. 8 and 11. The said blades $20^a$ are positioned at opposite sides of the inward path of movement of the platen and its package and operate during such movement to engage, fold and adherently affix the said marginal portions $a'$, against the opposite ends of the box or package with a wiping action.

Devices are provided for turning in and adherently affixing the marginal lap portions $b^2$ and $b^3$ of the wrapper-blank against the opposite ends of the package. These devices may be of any approved construction and in the instance shown, consist of two pairs of oppositely arranged wipers consisting of yieldable plates 22, carried by separate arms 23, two of said arms being mounted upon a rock shaft 24, and the other or companion arms being mounted upon a rock shaft 25. The shaft 24 is journaled in the bearings in one of the brackets 21, the shaft 25 being journaled in the other or companion bracket 21 of the pair of brackets that support a set of the folding and affixing devices. A rocking motion is imparted to the shaft 25 from the shaft 24 by means of a link 26 connected at one end to a crank arm 27 fixed to the shaft 24 and connected at its opposite end to a crank arm 28 mounted upon the shaft 25. By reason of the connections described the two pairs of wipers 22 may be moved simultaneously toward or from each other. The blank folding and affixing devices consisting of the brushes 20 and the wipers 22 are adjustably mounted upon the supporting plates 19 so that the machine may be adjusted to operate upon packages having walls of different dimensions. Each set of wipers 22 is actuated by means of an arm 29, Figs. 1 and 17 mounted upon one end of the shaft 24, the said arm 29 being arranged to contact with a fixed projection 30 during the advancing movement of the traveling carrier, the projection 30 being arranged to cause the wipers 22 to move toward each other to adherently affix the marginal laps $b^2$, $b^3$ of the wrapper-blank to the opposite ends of the box or package as the traveling carrier moves from the package receiving position to the next stop position, as more clearly shown in Fig. 1.

The wipers 22 are caused to remain in lap affixing position until the package is ejected from the carrier. This operation of the wipers is effected by means of a spring actuated pin 31 pivoted at 32 to the arm 29, the other end of the pin 31 being guided in an opening in a stud 33 carried by an arm of the carrier frame 2, as more clearly shown in Figs. 1 and 17. The spring actuated pin 31 acts upon the arm 29 so as to hold the same off center or in one or the other of two extreme positions, one of said positions representing the position of the shafts 24 and 25 when the wipers are in a lap-holding position, and the other wherein the wipers are thrown out or away from each other, or out of lap-holding position, as represented by the set of affixing devices illustrated to the left of Fig. 1, this being the position of the devices at the beginning of the wrapper-affixing operation.

The device for affixing the marginal lap $d$ of the wrapper-blank is more clearly shown in Figs. 1 and 18 and as illustrated, this device consists of a flat blade 34 mounted upon a bracket 35 carried by a rock shaft 36, the latter being journaled in the carrier frame 2, there being one of these blades 34 included in each set of affixing devices. The shaft 36 is provided at its outer end with a crank arm 37, which trails in somewhat the same path as the arm 29 and is arranged to be moved into lap-affixing position as shown in Fig. 18 by means of a cam surface 38 mounted upon a fixed part of the machine frame, the said arm 37 contacting with said cam surface 38 to cause the blade to move into lap-affixing position immediately the traveling carrier begins to move after the package has been delivered between the wipers 20. As the traveling carrier arrives at the next stop position following the package receiving position, the arm 37 comes into contact with the fixed projection 30 which operates during the advancing movement of the carrier to again rock the shaft 36 so as to move the wiper 34 out of lap-affixing position, which position is more clearly illustrated in the set of devices to the right of Fig. 1. The affixing blade 34 is held in its affixing and non-affixing positions respectively by means of a spring-actuated pin 38' pivoted at one end to the bracket 35 and having its other end guided in an opening in a stud 39 carried by a part of the carrier frame, this part acting similarly to the corresponding spring actuated pin which controls the movement of the arm 29.

The traveling carrier is given a step-by-step advancing movement, by means of the Geneva wheel described, there being in the present instance four step movements in each complete cycle of operations, the carrier being positively locked during each position of rest by mechanism presently to be described. All portions of the wrapper-blank except the top $c$, and two end label portions $c'$, are affixed to the package by the time the package reaches the next step position after leaving that position where the package is delivered to the machine. In the next or third step movement of the traveling carrier the top covering portion $c$ of the label encounters a brush wiper 40 which operates to wipe upon and adherently affix the same to the top wall of the box, this operation being more clearly shown in Fig. 1. A pair of fingers 40$^a$ are arranged above and project in front of the forward end of the brush 40. These fingers serve to engage the upstanding portion $c$ of the wrapper-blank and guide it toward the wall of the box to which it is applied, as the package moves toward the brush 40.

In order to insure secure application of the top portion $c$ of the wrapper-blank to the top of the box, I prefer to provide a rotary brush 41, which brush is arranged adjacent the path of movement of the package so as to have a wiping action upon the attached part of the blank and particularly the outer marginal edge thereof which overlies and is adherently attached to the marginal lap d.

The brush 41 is preferably driven by means of a driving chain or belt 42 driven from shaft 7, the latter being in turn driven from the vertically extending shaft 44 through the medium of beveled gears 45, also more clearly shown in Figs. 1 and 7.

After leaving the brush 41, the wrapper is completely applied to the package except for the two end labels c'. These are affixed by means of a pair of oppositely disposed brushes 46 arranged in line with a stop position of the carrier and between which the package is projected in a lateral direction after leaving the carrier. I prefer to provide in addition to the brushes 46, another pair of brushes 47 arranged at right angles to the brushes 46 so that the two pairs of brushes constitute a wiping and drying throat having wiping faces which operate upon all four vertical walls of the package to insure secure application of the wrapper-blank to such walls, and to smooth out any wrinkles that may appear. The packages may be ejected from the carrier by imparting an outward movement to each platen 15 as they successively reach the package ejecting position, it being understood that until the carrier reaches this position the platens are held depressed by means of the latches 18. As each latch 18 reaches the package ejecting position the outwardly extending arm of the latch engages a releasing pin 49 arranged in the path of travel of an arm of the latch as more clearly shown in Fig. 1, which disengages the latch from its toothed part 17 to permit outward movement of the platen to eject its package into the wiping and drying throat formed by the brushes 46 and 47. The platen is moved outwardly by means of a swinging arm 50, pivoted at 51, Fig. 7, the said arm having at its free end an open way 52, Figs. 1, 7 and 19, into which way an outwardly projecting stud 53 carried by the stem 14 of each platen passes as the platens successively reach the ejecting position. Movement of the arm 50 is effected by means of a cam 50ᵃ. As soon as a platen is in alinement with the throat formed by the brushes 46 and 47, the swinging arm 50 is given a downward movement through the mechanism just described to cause the platen to eject the package from the machine, the said platen being again restored to normal position through the medium of the cam 50ᵃ and its connections together with the connection formed by the guide-way 52 and projection 53. Immediately the traveling carrier begins to move away from the package ejecting position, the arm of the latch 18 moves out of the influence of the pin 49, and the latch immediately springs back into engagement with the toothed bar 17, while the coiled spring 16 serves to cause the platen to again assume its normal package engaging position, which position is illustrated by the position of the platen to the left of Fig. 1.

I prefer to make the throat formed by the bruhes 46 and 47 of sufficient length to hold a plurality of the wrapped packages as more clearly shown in Fig. 1, so as to afford an opportunity for the adhesively affixed wrappers to become thoroughly set and dry before the package is ejected from the machine. The packages may be carried away from the machine by means of an endless belt 54 arranged directly beneath the brush-throat as more clearly shown in Figs. 1, 2, 3 and 7, the belt passing over rollers 55 and 55ᵃ mounted upon shafts 56 and 56ᵃ, the shaft 56 being driven from the shaft 44 through the medium of beveled gears 57.

In the illustrated embodiment of the invention, the packages to be wrapped are fed into the machine from a support 58 arranged adjacent the path of movement of the platens 15, the upper face of said package support being in substantially the same plane as the lower edge of the platen so as to bear a fixed definite relation thereto and to an appropriate section of the wrapper-blank to effect proper register of the package with its blank, as will more fully hereafter appear.

The packages may be fed from the support into the machine by hand, although I prefer to feed them automatically by means of a mechanically operated pusher 59, as more clearly shown in Figs. 1, 7, and 8. When the mechanically operated pusher is employed I prefer to provide a package holding chute or hopper 60 above the package support 58, and I also prefer to provide the pusher 59 with a package cut off plate 61 arranged to move back and forth through the chute 60 so as to effect an automatic feed of the packages through the chute to the supporting plate as the pusher is operated.

The mechanical means for operating the pusher is more clearly shown in Fig. 7, and consists of an oscillating arm 62 fixed to a shaft 63, the said arm having a link connection 64 at its upper end with the rear side of the pusher, the latter being guided in its movements by means of a rod 65 moving through bearings 66. Rocking movement is imparted to the shaft 63 by means of an arm 67 having a rod connection 68 with a cam 69 mounted upon the shaft 7, as more clearly shown in Figs. 7 and 8. It will be understood that the parts are so timed with relation to the movements of the carrier, that a package will be forced against its platen and then between its associated wrapper-folding and affixing devices as the platens and said devices successively appear at the package receiving position of the machine.

I prefer to provide the machine with mechanism for automatically selecting wrapper-blanks singly from a stack of such blanks, gumming mechanism for coating the blanks on one face with adhesive and mechanism for successively transporting the adhesively coated blanks to the folding and affixing devices. These mechanisms are more clearly shown in Figs. 2, 3, 4, 5 and 6 of the accompanying drawing, and while I have herein shown a preferred construction of mechanism for feeding and gumming the wrapper blanks, I do not wish to be understood as limting myself to the specific type of mechanisms illustrated, as I am aware that other mechanisms for performing these functions may be employed in conjunction with other parts of the machine, without departing from the spirit of the invention.

The gumming means illustrated consists of a pair of separated glue-applying rolls 70 arranged parallel to each other, each roll having a plurality of spaced glue-applying faces 71, the glue-applying faces of one roll being arranged opposite the spaces which separate the faces of the other roll so that when a sheet or blank is drawn successively across the faces of the two rolls, one face of the sheet or blank will have a coating of glue applied throughout substantially the entire area thereof. The general arrangement of the glue-applying rolls with their spaced glue-applying faces is shown in Fig. 3.

A thin coating of glue is applied to the glue-applying faces of the two rolls 70 by means of a distributer roll 72, which receives its coating of glue from a supply roll 73 submerged in a supply of glue contained in the tank 74, which tank may be provided with a steam jacket 75 to maintain the glue at the proper temperature when hot glue is employed. Arranged above the glue-applying rolls 70 is a blank supporting platen made in the form of a drum 76 mounted upon a shaft 77, which shaft is driven by means of a pair of sprocket wheels 78 through the medium of a pair of chain carriers 79, which chain carriers travel about sprocket wheels 80 fixed to the shaft 3 of the traveling carrier, so that the blank supporting platen 76 is moved in timed relation with the movements of the traveling carrier. The blank supporting platen 76 is preferably provided on its periphery with a raised form 81 having the shape or outline of the wrapper-blank employed, the purpose of this being to cause the wrapper-blank being glued to be off-set from the peripheral face of the platen to prevent glue from being applied to any portion of the platen except that portion carrying the wrapper-blank.

Mechanism is provided for selecting and feeding the wrapper-blanks singly from a stack or package of such blanks, and in the instance shown this mechanism consists of a vertically inclined table 82 to which a reciprocating motion is imparted by means of a link 83 pivoted at one end to the under side of the table and having its free end connected to a crank pin 84 carried by a disk 85, motion being imparted to the disk 85 through the medium of a gear-wheel 86 which is in engagement with a gear-segment 87 having a link connection 88 with a crank pin 89 on a disk 90, as more clearly shown in Figs. 2, 3 and 4. Journaled so as to oscillate in a part of the frame of the machine adjacent the upper end of the table 82 upon which the pack of wrapper-blanks is supported, is a hollow suction roll 91 having one or more suction apertures 92, which aperture or apertures 92 serve, when the pack of sheets is in the position shown in Fig. 2, to draw the lowermost sheet of the pack into contact with the roll, and upon advancing movement of the table 82, to feed said undermost sheet forward and guide the same under the guide finger 93 toward a pair of feed rolls 94 and 95, as more clearly shown in Fig. 2, the feed rolls being positively driven in any suitable manner so as to feed the forward end of each blank between the guide fingers 96 with one face of the blank into contact with the spaced glue-applying faces 71 of the first encountered glue-applying roll 70, a portion of the blank-supporting platen at this point causing the wrapper-blank to bear with sufficient pressure upon the glue-applying faces of the roll to apply spaced stripes of glue to a face of the blank. After the blank has passed over the glue-applying faces of the first encountered glue-applying roll 70, one of the gripper fingers 97, of which there are a number of such fingers carried by the pair of the endless chains 79, operates to grasp the forward edge of the blank so that during continued movement of the gripper-fingers, the blank will be drawn over and in contact with the glue-applying faces of the other glue-applying roll 70 to apply stripes of glue between the stripes applied by the first glue-applying roll so that the blank after passing over the two glue-applying rolls will have a uniform coating of glue applied over substantially the entire face of the blank, it being understood that the raised form 81 and its platen serve to press the blank against the glue-applying rolls with just sufficient pressure to have a uniform coating of glue applied to the blanks as they are being drawn over the rolls.

In order to prevent the blanks from winding about the glue-applying rolls as they pass from one to the other stripper fingers 98 are provided, these being arranged between the two rolls 70, as more clearly shown in Figs. 2, 3 and 6.

The forward portion of the pack of wrapper-blanks resting upon the reciprocating table 82 is supported upon a plurality of tapes 99, which tapes are passed around the suction roll 91, one end of each tape being secured to the under side of the table and the other end being connected by a spring 100, a portion of each tape being looped about an idler roll 101, as more clearly shown in Fig. 2, the arrangement maintaining proper tension on the tapes to support the front end of the pack of blanks when the reciprocating table 82 is in its lowermost position.

An oscillating stop 102, Figs. 4 and 6, is provided to maintain the forward edge of the sheets of the pack in accurate alinement during the reciprocation of the pack. The feed roller 94 is positively moved toward and away from the feed roller 95 by means of an arm 96 shown in dotted lines in Fig. 2, the lower end of the arm 96 carrying a roller with which an adjustable cam 97$^a$ engages to cause the feed roller 94 to be moved at regular intervals toward and from the roller 95 to permit feeding of the separate wrapper-blanks therebetween, and to hold the two rollers out of contact during the interval of time when there is no blank fed therebetween, it being understood that the cam 97$^a$ is so adjusted as to cause the feed roller 94 to move away from the feed roller 95 after the blank has been gripped by the grippers 97, and to remain away until after the succeeding blank is fed between the feed rollers whereupon they again come together to perform their feeding function.

It is desirable to provide means for throwing the gumming mechanism out of operation in case the sheet selecting and feeding means fails to feed a blank to the gumming mechanism so as to prevent the glue-applying rollers of the mechanism from smearing the form 81 with glue. To accomplish this, I mount each of the glue-applying rolls 70 on pivoted arms 103, as more clearly shown in Figs. 2, 3, 4, 5 and 6, each arm carrying an open bearing 104 in which the glue-applying rolls 70 are removably mounted for cleaning purposes and each arm being urged in an upward direction by means of a spring 105. Each arm is further provided with an inclined wall 106, the wall of one arm facing the corresponding wall of the other arm to provide a substantially wedge-shaped space between the two arms, between which a wedge block 107 is adapted to be moved, the said wedge block having rollers 108 which ride upon the inclined walls 106 and operate when the wedge block 107 is drawn downward as illustrated in Fig. 5 to rock the arms 103 so as to move the glue-applying faces 71 of the glue-applying rolls 70 out of the path of movement of the blank supporting platen. The wedge block 107 is actuated by means of a solenoid magnet 109, see Fig. 4, which magnet is in circuit with the two blank feed rolls 94 and 95, the circuit being completed when the rolls are in direct contact with each other, as for instance, when a blank fails to be fed forward by the suction roll 91. Should the suction roll fail to feed a blank, the circuit will be completed through the magnet 109, which will cause the wedge block to be drawn downwardly, with its rollers 108 acting upon the inclined walls, thus rocking the arms 103, and moving the glue-applying faces 71 of the glue-applying rolls 70 out of the path of movement of the platen. So long as the feed rolls 94 and 95 are separated from each other, as by the presence of a blank therebetween, or during the time the roll 94 is held away from the roll 95 by its cam 97$^a$, the circuit in which the magnet 109 is included will be broken, and the glue-applying rolls will remain in glue-applying position.

It is, of course, understood that suitable means is provided to prevent the glue applying rollers 71 from shifting into contact with the platen, when no blank is fed, upon the movement of feed roll 94 away from feed roll 95 caused by cam 97. One construction for this purpose includes the provision of an arm or extension 103$^a$ (Fig. 2) mounted on the roll-carrying arm 103 nearest the feed rolls and carrying a link 96$^a$ having a pin-and-slot connection with arm 96. The slot in link 96$^a$ is so proportioned that during normal operation of the machine, with rolls 71 in elevated position, the pin carried by arm 96 will reciprocate in the slot during movements of said arm without interfering therewith. When, however, roll 91 fails to feed a sheet between the feed rolls 94 and 95 and the consequent contact thereof actuates solenoid 109, retracting rolls 71, the consequent movement of arm 103$^a$ will shift link 96$^a$ to the left, so that the right-hand end of the slot therein will engage the pin carried by arm 96 and prevent movement of said arm to the right, an operation which normally takes place after the sheet has been engaged by the grippers and before the end of the sheet passes between the feed rolls 94 and 95. In other words, roll 94 is locked in engagement with roll 95 whenever an initial contact between said rolls actuates solenoid 109 and shifts gluing rolls 71 and link 96$^a$ connected thereto. The contact between the feed rolls is only broken, and normal operation resumed, when a sheet is forced between the rolls, this operation being readily accomplished owing to the positive rotation of roll 95; and after such contact breaks, normal operation will be resumed, as link 96ª will again be shifted to the right into normal position.

Inasmuch as the wrapper-blanks are notched or cornered, it is necessary that an appropriate section thereof as well as the corner points be accurately positioned with relation to a given wall of the box or package, and also with relation to an edge of one of the platens 15 of the wrapper-blank folding and affixing mechanism, otherwise an unsightly and unmarketable package will result. An important feature therefore of the present invention is the provision of means for transferring the wrapper-blanks from the gumming means to and in coöperative register relation with the package and its associated platen.

As before described, the transferring means consists of a pair of endless chain carriers 79 provided with a plurality of grippers 97, there being a plurality of the gripper-fingers associated with the chain carrier so that a plurality of the blanks may be fed simultaneously and successively positioned as the respective platens 15 successively appear at the package receiving position.

It will be noted by referring to Figs. 1 and 2, that one run of the chain carrier moves in a substantially vertical direction, and that each wrapper-blank is gripped at its upper end so that the blanks move toward the package support 58 in a suspended condition. By carrying the wrapper-blanks forward in this manner, they are not so likely to curl under the influence of the moist adhesive coating, and I consider this arrangement to be important for reasons stated.

As the traveling carrier rotates, the endless chains 79 with their grippers 97 move upward, carrying the adhesively coated blanks with them. The grippers are so arranged with relation to other parts of the machine that when that portion of the wrapper-blank, as for instance the section a, reaches a point directly opposite the platen 15, which is in package-receiving position adjacent the package support 58, the traveling carrier together with the wrapper-transferring means will be positively locked so as to insure proper register of the wrapper-blank and so as to maintain the blank in register position until that wall of the package lying directly opposite the section a of the blank is moved into contact with said section, the grippers 97 at this moment in the operation being moved to open position to free the blank by the end 97ª of the gripper arm coming in contact with a fixed cam 97ᵇ as more clearly shown in Fig. 1, it being understood that the pusher 59 is automatically brought into action the moment the blank is brought to register position so as to immediately push the package against the blank which is then backed up by one of the platens 15, the pusher forcing the package with its wrapper between the set of folding and affixing devices associated with the positioned platen in the manner heretofore described.

The means for positively locking the traveling carrier as well as the wrapper-blank transferring means so as to insure proper register of the wrapper-blanks is more clearly shown in Figs. 7 and 9, and consists of a locking bolt 110 that is arranged to successively enter one of four sockets 112, carried by one of the sprocket wheels 80, one socket being provided for each set of wrapper-folding and affixing devices. The locking bolt 110 is automatically moved into and out of locking position by means of a bell crank lever 113 actuated by a rod 114, which lever receives its motion from a cam 115 mounted upon the shaft 7, as more clearly shown in Fig. 7. The cam 115 is so timed that immediately the traveling carrier arrives at the wrapper-receiving position, the locking bolt will be moved into position to lock the carrier and immediately a package has been forced into the initial set of wrapper-folding and affixing devices, the locking bolt will be withdrawn so as to permit the carrier to advance to the next stop position.

It will be further understood that the blank transferring means and its associated gumming means are so timed that whenever a new set of wrapper-folding and affixing devices appear at the wrapper-receiving position, a new wrapper-blank will also be fed to proper register position.

I prefer to provide that run of the wrapper transferring means which carries the wrappers from the gumming means to the package-receiving position, of sufficient length to simultaneously transport a plurality of wrapper-blanks so that the coating of adhesive material will have sufficient time to become more or less set or tacky before the package is moved into contact therewith, and this is another feature of the special design of the machine, and one which I consider to be important and novel.

I do not wish to be understood as limiting myself to the particular wrapper-folding and affixing means shown and described, as I am aware that changes may be made in the construction without departing from the spirit of the invention, neither do I wish to be understood as limiting myself to the specific means shown for feeding and gumming the wrapper-blanks as I am aware that other selecting, feeding and gumming means may be employed without departing from the spirit of the invention.

I do not make specific claims in the present application to the sheet selecting and gumming means except as such or equivalent means may be claimed in combination with other coöperative features of the machine as such sheet selecting and gumming means are shown, described and claimed in my co-pending application, Serial No. 110,057 filed July 19th, 1916.

What I claim is:

1. A machine for adherently affixing adhesively coated wrapper blanks of the notched or cornered type to the exterior walls of a package in the manufacture of sealed wrapped packages, comprising in combination means for advancing a package to bring a wall thereof into contact with a selected adhesively coated section of a positioned wrapper blank to adherently affix said section of the blank to said wall the direction of advance being at substantial right angles to the plane of the positioned blanks means for thereafter adherently affixing adjacent adhesively coated side covering sections of the blank to two side walls of the package devices for adherently affixing other adhesively coated portions of the blank to opposite ends of the package and means for thereafter adherently affixing adhesively coated end label portions of the blank to the opposite end walls of the package to cover said walls.

2. A machine for affixing adhesively coated wrapper blanks of the notched type to the exterior walls of a package, in the formation of sealed wrapped packages, comprising a traveling carrier, a plurality of package holding devices movable with said carrier, means for successively advancing adhesively coated wrapper blanks and positioning them in coöperative relation with said package holding devices, means for successively feeding packages to be wrapped in a direction substantially transverse to the plane of the positioned blank to locate a side wall of each package in direct contact with a selected adhesively coated portion of a positioned wrapper blank and thence into said holding devices, means for advancing the carrier, means for adherently affixing portions of the blank in position contacting with the remaining side walls of the package, and means for adherently affixing adhesively coated marginal portions of the blank across each of the four edges of the end walls of the packages.

3. A machine for affixing adhesively coated wrapper blanks of the notched type, providing a plurality of marginal laps, to the exterior walls of a package in the formation of sealed wrapped packages comprising a traveling carrier, a plurality of package holding devices movable with said carrier, means for successively advancing adhesively coated wrapper blanks and positioning them in coöperative relation with said package holding devices, means for successively feeding packages to be wrapped in a direction substantially transverse to the plane of the positioned blank to locate a side wall of each package in direct contact with a selected adhesively coated portion of a positioned wrapper blank and thence into said holding devices, means for advancing the carrier, means for wrapping the body portion of the blank about the package and completely covering the side walls with the longitudinal blank edges in adhesively connected superposed position, and means for adherently affixing to the end walls of the package adhesively coated marginal laps adjacent each edge of each end wall.

4. A machine for affixing adhesively coated wrapper blanks of the notched type, providing a plurality of marginal laps, to the exterior walls of a package in the formation of sealed wrapped packages, comprising a traveling carrier, a plurality of package holding devices movable with said carrier, means for successively advancing adhesively coated wrapper blanks and positioning them in coöperative relation with said package holding devices, means for successively feeding packages to be wrapped in a direction substantially transverse to the plane of the positioned blank to locate a side wall of each package in direct contact with a selected adhesively coated portion of a positioned wrapper blank and thence into said holding devices, means for advancing the carrier, means for wrapping the body portion of the blank about the package and completely covering the side walls with the longitudinal blank edges in adhesively connected superposed position, means for positioning against each end wall an end covering wrapper section, and means for folding marginal laps against the package walls in position to provide continuous adhesive connection between the edges of said end portions and the body portion of the wrapper.

5. A machine for affixing adhesively coated wrapper blanks to the exterior walls of a package in the manufacture of sealed wrapped packages, comprising in combination a traveling carrier, a plurality of platens mounted upon and movable with said carrier, a set of wrapper blank folding and affixing devices associated with each platen, a package support or rest arranged adjacent the path of movement of the platens, means coöperating with but independent of the carrier for successively positioning the adhesively coated wrapper blanks in coöperative relation with said package support or rest and one of said platens, means for imparting a step by step advancing movement to the carrier, and means for temporarily locking the wrapper blank advancing means against movement to effect an accurate register of a selected wall of the blank with relation to each associated platen and the package support or rest.

6. A machine for affixing adhesively coated wrapper blanks to the exterior walls of a package, in the manufacture of sealed wrapped packages, comprising a traveling carrier, a plurality of yieldable platens mounted upon and movable with the carrier, a set of wrapper blank folding and affixing devices associated with each platen, a package support arranged adjacent the path of movement of the platens, means coöperating with but independent of the carrier for successively advancing adhesively coated wrapper blanks between the said support and one of the platens, means for imparting a step by step advancing movement to the carrier, and means for temporarily locking the wrapper advancing means against movement when a selected wall of a wrapper blank advanced thereby has been accurately positioned between the support and a platen to effect accurate register of said selected section with a given wall of the package located on the support.

7. In a machine for forming sealed wrapped packages with the wrapper blanks of the notched or cornered type, a package delivery station, a traveling carrier, a plurality of platens mounted upon and movable with said carrier, a set of wrapper-blank folding and affixing devices associated with each platen, means for moving said carrier to locate a platen in opposition to said station, a gumming device for applying adhesive over one face of wrapper-blanks fed thereto, and blank transferring means coöperating with but independent of the carrier for transferring the adhesively coated wrapper blanks from the said gumming means to a position overlying one of said platens to locate a predetermined portion of the blank in direct opposition to a package advancing from said station.

8. In a machine for forming sealed wrapped packages with the wrapper blanks of the notched or cornered type, a package delivery station, a traveling carrier, a plurality of platens carried by and movable with said carrier, a set of wrapper-blank folding and affixing devices associated with each platen, means for moving said carrier to locate a platen in opposition to said station, a gumming device for applying adhesive to one face of wrapper-blanks fed thereto, a support for a stack of wrapper-blanks, means for selecting the wrapper-blanks singly from the stack and for feeding them into the gumming device and a wrapper-transferring means coöperating with but independent of the carrier for taking the wrappers from the gumming device and transporting them successively with a selected wall in position opposite one of the said platens and in assembly position relative to a package positioned in said station.

9. In a machine for forming sealed wrapped packages, a traveling carrier mounted for movement in a vertical plane, a plurality of platens carried by and movable with said carrier, a set of wrapper folding and affixing devices associated with each platen, a gumming device for applying adhesive over one face of wrapper-blanks fed thereto, and a transferring means coöperating with but independent of the carrier and movable in a vertical plane for transporting suspended wrappers successively from the gumming device and positioning them with a selected wall over one of said platens.

10. In a machine for forming sealed wrapped packages with the wrapper blanks of the notched or cornered type, a package delivery station, a traveling carrier, a plurality of sets of wrapper-blank folding and affixing devices movable with said carrier, means for successively positioning adhesively coated wrapper-blanks in coöperative relation with one of said sets of folding and affixing devices and with a predetermined portion of a blank in direct opposition to a package within said station, means for successively feeding packages to be wrapped from said station between said affixing devices with a wall thereof in contact with such adhesively coated portion of the positioned wrapper-blank to adherently affix said portion to said wall and to cause other adhesively coated portions to be adherently affixed to other walls of the package, means for advancing the carrier with a step-by-step advancing movement, means for actuating certain of the affixing devices during the travel of the carrier to adherently attach other coated portions of the wrapper-blank to other walls of the package, means for ejecting the packages from between the folding and affixing devices, and a wiping throat into which the packages are successively projected to affix the remaining unattached portions of the wrapper to the end walls of the package.

11. In a machine for forming sealed wrapped packages with the wrapper blanks of the notched or cornered type, a package delivery station, a traveling carrier, a plurality of platens carried by and moving with said carrier, a set of wrapper folding and affixing devices associated with each platen, means for successively positioning adhesively coated wrapper-blanks in coöperative relation with one of said platens and with a predetermined portion of a blank in direct opposition to a package within said station, means for successively feeding packages to be wrapped from said station between said sets of folding and affixing devices with a wall thereof in contact with such adhesively coated portion of the positioned wrapper-blank lying adjacent the platen to adherently affix said portion to said wall, and to cause other adhesively coated portions of the blank to be adherently affixed to other walls of the package, means for imparting a step-by-step advancing movement to the carrier, means for adherently affixing other portions of the wrapper-blank to other walls of the package during the movement of the carrier, oppositely disposed brush-wipers for affixing end-lap portions of the wrapper-blank to the opposite ends of the package, and means for ejecting the package from the carrier between the said wipers.

12. A machine for affixing adhesively coated wrapper blanks of the notched type, providing a plurality of marginal laps, to the exterior walls of a package in the formation of sealed wrapped packages, comprising a traveling carrier, a plurality of package holding devices movable with said carrier, means for successively advancing adhesively coated wrapper blanks and positioning them in coöperative relation with said package holding devices, means for successively feeding packages to be wrapped in a direction substantially transverse to the plane of the positioned blank to locate a side wall of each package in direct contact with a selected adhesively coated portion of a positioned wrapper blank and thence into said holding devices, means for advancing the carrier, means for folding marginal laps about three edges of each end wall of the package into contact with said end wall, and means for folding an end covering portion of the blank about the fourth edge of each end wall into adhesive engagement with the marginal laps folded across the remaining three edges.

13. A machine for adherently affixing adhesively coated wrapper-blanks of the notched or cornered type to the exterior walls of a package in the manufacture of sealed wrapped packages, comprising in combination, means for advancing a package with a wall thereof into contact with a selected section of a positioned wrapper-blank to adherently affix said section of the blank to said wall, the direction of advance being at substantial right angles to the plane of the positioned blank, wipers for thereafter adherently affixing adjacent side covering sections of the blank to two side walls of the package, devices for adherently affixing marginal edge portions of the blank to opposite end walls of the package and means for thereafter adherently affixing end-label portions of the blank to the opposite end walls of the package to cover said end walls.

14. In a machine for forming sealed wrapped packages, a traveling carrier, a plurality of platens mounted upon and movable with said carrier, a set of wrapper-blank folding and affixing devices associated with each platen, a package support arranged adjacent the path of movement of the platens, means independent of the carrier for successively transporting adhesively coated wrapper-blanks and positioning them successively in coöperative relation with such package support and one of the platens, means for temporarily holding the wrapper transporting means against movement to effect an accurate register of each wrapper-blank with relation to its associated platen and the package support, means for feeding the packages with a wall thereof into contact with a selected adhesively coated wall of the wrapper-blank and against the associated platen and means for imparting a step-by-step advancing movement to the carrier.

15. An organized machine for adherently affixing adhesively coated wrapper blanks of the notched or cornered type having wall covering sections and integral end wings to the exterior walls of a package in the manufacture of sealed wrapped packages, comprising in combination, means for applying adhesive over a face of the said sections and wings of wrapper blanks fed thereto, means for bodily advancing the adhesively coated wrapper blanks, a package rest or support for the packages to be wrapped, means for arresting the movement of the wrapper advancing means to bring a selected adhesively coated section of the wrapper blank in opposition to and coöperative relation with said support and in alined position to receive a given wall of the package, means including wing affixing devices for thereafter adherently affixing other adhesively coated sections of the wrapper blank to other selected walls of the package and for folding and adhesively affixing certain of the adhesively coated wings of the blank to opposite ends of the package, and means for thereafter adherently affixing the remaining adhesively coated end wings of the blank to opposite end walls of the package to provide a wrapped and sealed package having a smooth exterior.

16. In an organized machine for adherently affixing adhesively coated wrapper blanks of the notched or cornered type having wall covering sections and integral end wings to the exterior walls of a package in the manufacture of sealed wrapped packages, in combination, means for applying adhesive over a face of the said sections and wings of wrapper blanks fed thereto, means including wing affixing devices operating in stages for progressively affixing said adhesively coated sections and wings of the wrapper blank to the exterior walls of the package, and means for initially centering the package and adhesively coated wrapper blank with a selected adhesively coated section of the blank in accurate register with the corners of a given wall of the package, whereby the initial assembly will cause the several sections of the blank to be accurately applied to the side walls of the package and the said adhesively coated wings accurately folded about the edges and adhesively affixed to the end walls of the package to produce a sealed package with a smooth exterior.

17. In an organized machine for adherently affixing adhesively coated wrapper blanks of the notched or cornered type having wall covering sections and integral end wings to the exterior walls of a package in the manufacture of sealed wrapped packages, in combination, means for applying adhesive over a face of the said sections and wings of wrapper blanks fed thereto, means including wing affixing devices operating in stages for progressively affixing said adhesively coated sections and wings of the wrapper blank to the exterior walls of the package, means for initially assembling a blank and package with a given wall of the package centered in adhesive contact with a selected adhesively coated section of the blank to maintain the register of the assembly, and means for thereafter advancing the assembled blank and package in association with the said progressively operating affixing means for adherently affixing the adhesively coated sections and wings of the blank to the side and end walls respectively of the package to produce a sealed wrapped package having a smooth exterior.

In testimony whereof I affix my signature in the presence of two witnesses.

JAMES D. REIFSNYDER.

Witnesses:
ELIZABETH V. MARTIN,
EUGENE M. JEAMISSON.